US011048866B1

(12) United States Patent
Papineni et al.

(10) Patent No.: US 11,048,866 B1
(45) Date of Patent: Jun. 29, 2021

(54) AD HOC CONTACT DATA CAPTURE

(71) Applicant: Intuit Inc., Mountain View, CA (US)

(72) Inventors: Kishore Papineni, The Ponds (AU); Pawan Preet Singh, Mountain View, CA (US); Mohsin Patel, Mountain View, CA (US); Nikita Bhambhani, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/714,303

(22) Filed: Dec. 13, 2019

(51) Int. Cl.
| | | |
|---|---|---|
| *G06F 17/00* | (2019.01) | |
| *G06F 40/174* | (2020.01) | |
| *G06F 16/958* | (2019.01) | |
| *G06F 11/30* | (2006.01) | |
| *G06F 3/0482* | (2013.01) | |
| *G06F 40/295* | (2020.01) | |
| *G06F 40/109* | (2020.01) | |
| *G06F 11/34* | (2006.01) | |

(52) U.S. Cl.
CPC .......... *G06F 40/174* (2020.01); *G06F 3/0482* (2013.01); *G06F 11/302* (2013.01); *G06F 11/3438* (2013.01); *G06F 16/986* (2019.01); *G06F 40/109* (2020.01); *G06F 40/295* (2020.01)

(58) Field of Classification Search
CPC .... G06F 40/174; G06F 40/295; G06F 40/109; G06F 16/986; G06F 3/0482; G06F 11/3438; G06F 11/302
See application file for complete search history.

(56) References Cited

U.S. PATENT DOCUMENTS

| | | | |
|---|---|---|---|
| 10,585,560 B2* | 3/2020 | Filippi | G06F 40/169 |
| 2002/0111995 A1* | 8/2002 | Mansour | H04L 29/06 |
| | | | 709/203 |
| 2005/0060647 A1* | 3/2005 | Doan | G06F 16/248 |
| | | | 715/205 |
| 2007/0043767 A1* | 2/2007 | Osborne | G16H 40/63 |
| 2014/0040786 A1* | 2/2014 | Swanson | G06F 3/0484 |
| | | | 715/760 |
| 2014/0089472 A1* | 3/2014 | Tessier | H04L 67/22 |
| | | | 709/219 |
| 2014/0222577 A1* | 8/2014 | Abhyanker | G06Q 10/10 |
| | | | 705/14.58 |
| 2017/0262527 A1* | 9/2017 | Sato | G06F 16/334 |
| 2017/0286525 A1* | 10/2017 | Li | G06F 16/2477 |
| 2018/0069937 A1* | 3/2018 | Kolleri | G06Q 10/1093 |
| 2018/0309807 A1* | 10/2018 | Smith | G06F 3/0482 |
| 2019/0362290 A1* | 11/2019 | Rogynskyy | G06F 21/6218 |
| 2019/0370824 A1* | 12/2019 | Rathod | G06Q 30/02 |

(Continued)

*Primary Examiner* — Laurie A Ries
(74) *Attorney, Agent, or Firm* — Ferguson Braswell Fraser Kubasta PC (57) ABSTRACT

Ad hoc contact data capture includes establishing a connection to a software application. A browser renders a source page from a source server. An extension of the browser receives a page event from the browser after rendering the page, the page event identifying a selected location of the source page. Ad hoc contact data capture further includes identifying source data from the source page after receiving the page event, calculating a distance between a contact element of the source page and the selected location to identify the source data, and populating the source data into the software application.

20 Claims, 8 Drawing Sheets

(56) References Cited

U.S. PATENT DOCUMENTS

2020/0042651 A1\* 2/2020 Curtis .................... G06N 5/022
2020/0250178 A1\* 8/2020 Boster ................... G06F 16/252
2020/0257576 A1\* 8/2020 Gallagher ............. G06F 40/174

\* cited by examiner

AD HOC CONTACT DATA CAPTURE

BACKGROUND

Software applications use contact information to perform a variety of operations. The contact information may be available from other Internet websites but may also use different styles and be in different locations on the pages from different websites. A challenge is for computing systems to identify the contact information on different websites and populate the information into the software application.

SUMMARY

In general, in one aspect, one or more embodiments relate to a method that includes establishing a connection to a software application, rendering, by a browser, a source page from a source server, and receiving, by an extension of the browser, a page event from the browser after rendering the page. The page event identifies a selected location of the source page. The method further includes identifying source data from the source page after receiving the page event, calculating a distance between a contact element of the source page and the selected location to identify the source data, and populating the source data into the software application.

In general, in one aspect, one or more embodiments relate to a system that includes a processor and a memory coupled to the processor. The memory includes a browser that executes on the processor and uses the memory. The browser is configured for rendering a source page from a source server. The memory further includes an extension that executes on the processor and uses the memory. The extension is configured for receiving, by the extension, a page event from the browser after rendering the page. The page event identifies a selected location of the source page. The extension is further configured for identifying source data from the source page after receiving the page event, calculating a distance between a contact element of the source page and the selected location to identify the source data, and populating the source data into a software application.

In general, in one aspect, one or more embodiments relate to a set of one or more non-transitory computer readable mediums that include computer readable program code for establishing a connection to a software application, and receiving, by an extension of a browser, a page event from the browser after rendering the page. The page event identifies a selected location of the source page. The non-transitory computer readable mediums further include computer readable program code for identifying source data from the source page after receiving the page event, calculating a distance between a contact element of the source page and the selected location to identify the source data, and populating the source data into the software application.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The use of the terms "software application," "program," and "application," when referring to software, means any set of instructions or program code in virtually any programming language, compiled, uncompiled, scripted, or object code, that executes on a processor. Examples of such instructions or program code include a subroutine, an enterprise application, an extension, a local application, a web application, or any portion thereof.

A page event refers to an event (i.e., a software event) generated by a browser in response to a user action. The event is a notification of the action. Events may be triggered by right clicking on a page, navigating to a new page, removing a bookmark, closing a tab, etc. Upon detecting an event, a browser may execute a program or script based on the event to handle the event.

In general, embodiments of the invention use an extension of a browser to track the mouse location and clicks on a web page to infer the location of the contact information in the web page. The browser opens a page from a website, such as a third party review site, describing a business. In one example, the user right clicks at a selected location near the name of the business on the page and selects a menu item from the right click menu that triggers execution of the extension. The extension identifies the hypertext markup language (HTML) element that was clicked on along with nearby elements. Based on the properties of the nearby elements and the distance from the nearby elements to the selected location, the extension identifies the source data about the business from the page. The extension may verify the source data with verification data retrieved using a verification API and then may create a contact in a software application with the source data. Thus, embodiments create a new user interface for copying the information from the page to the software application.

Figure 1A:
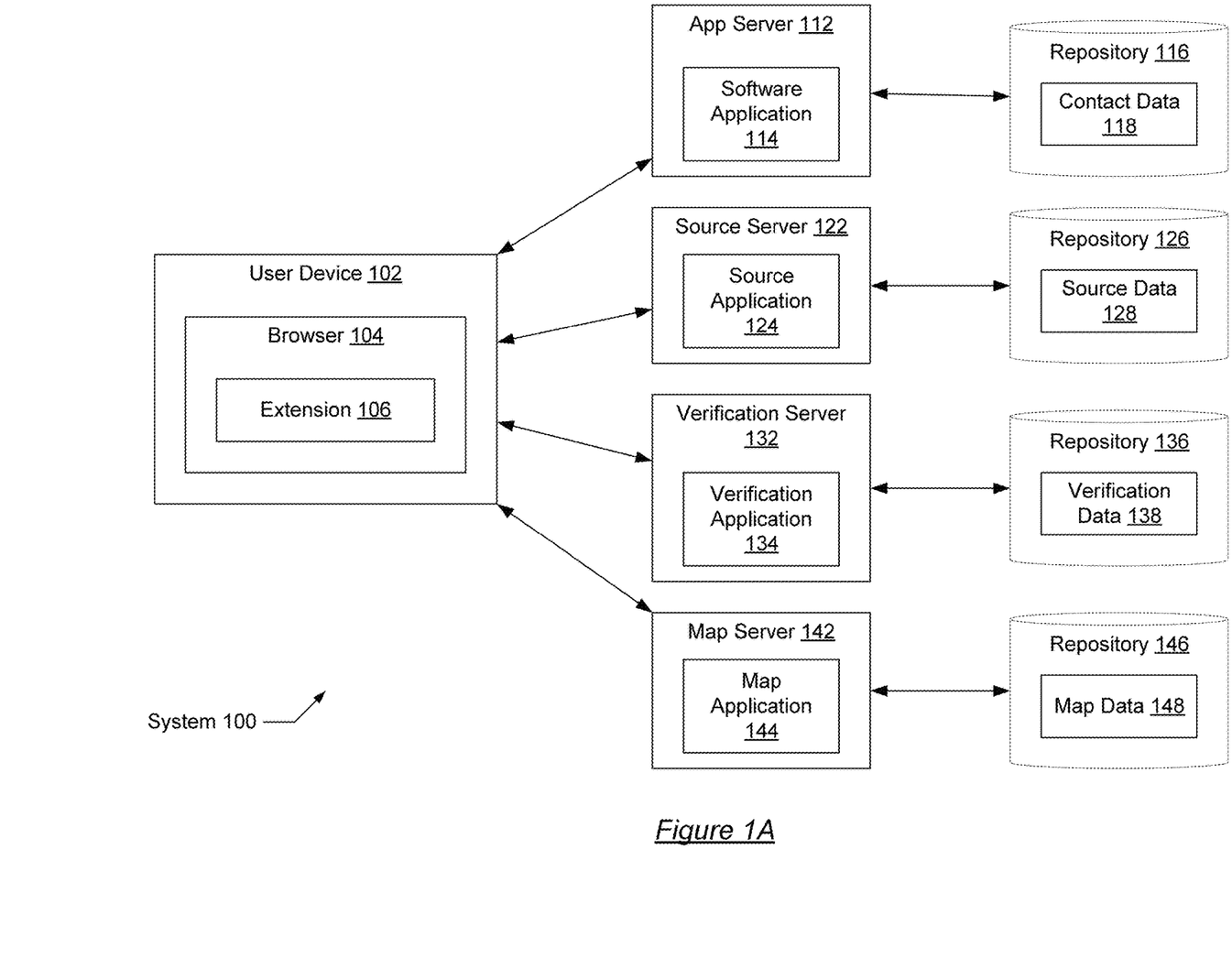
FIG. 1A and FIG. 1B show diagrams of systems in accordance with disclosed embodiments.
Figure 1B:
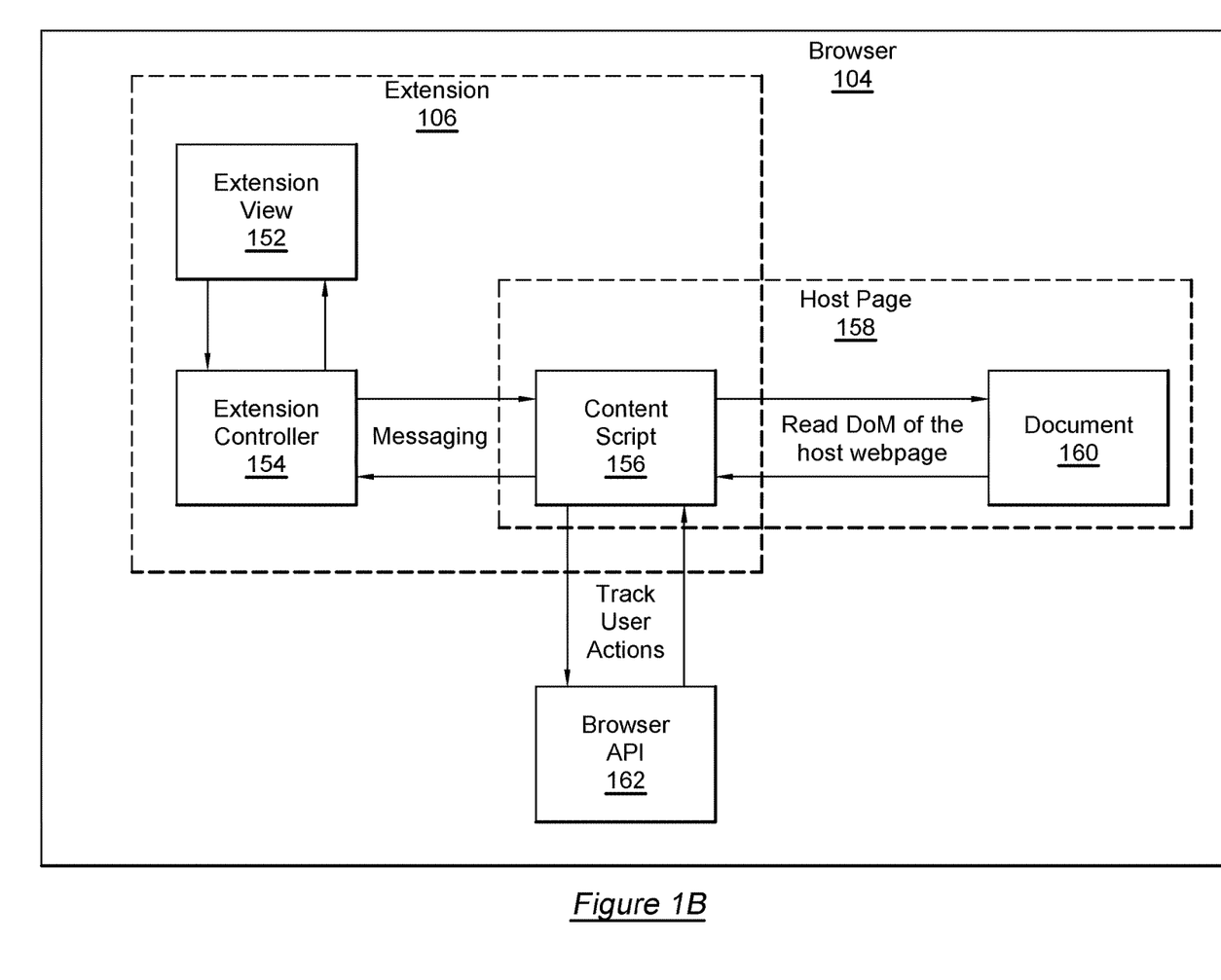

FIGS. 1A and 1B show diagrams of embodiments that are in accordance with the disclosure. The embodiments of FIGS. 1A and 1B may be combined and may include or be included within the features and embodiments described in the other figures of the software application. The features and elements of FIGS. 1A and 1B are, individually and as a combination, improvements to technology that includes Internet browser computing systems. The various elements, systems, and components shown in FIGS. 1A and 1B may be omitted, repeated, combined, and/or altered as shown from FIGS. 1A and 1B. Accordingly, the scope of the present disclosure should not be considered limited to the specific arrangements shown in FIGS. 1A and 1B.

Turning to FIG. 1A, the system (100) includes the user device (102), the servers (112), (122), (132), and (142) and the repositories (116), (126), (136), and (146). In general, the system (100) captures the source data (128) from a web page to populate the contact data (118) into the software application (114). The source data (128) is captured with the extension (106) running in the browser (104) on the user device (102).

The browser (104) is a software application for accessing information on the World Wide Web, where documents and other web resources are identified by Uniform Resource Locators (URLs, such as https://www.example.com/), which may be interlinked by hypertext, and are accessible over the Internet using multiple protocols and application programming interfaces (APIs). The browser (104) includes an API used by the extension (106) to interact with the software applications of the system (100) and the user of the user device (102). The browser (104) displays information to the user of the user device (102) with a graphical user interface.

The extension (106), which may also be referred to as a browser extension, is a software module that customizes the browser (104). The source code of the extension (106) may include code written in JavaScript, python, hypertext markup language (HTML), cascading style sheets (CSS), etc. The extension (106) may be provided by the services provider that operates the software application (114) running on the app server (112). The extension (106) identifies the source data (128) (described below) from within the contact information provided by the source application (124) (described below) in a web page. The source data (128) that is extracted by the extension (106) may be incorrect or incomplete. The extension (106) may verify and supplement the contact information with the verification data (138) (described below). The extension (106) may present a view of the contact information with a map from the map data (148). In response to interaction from a user of the user device (102), the extension (106) may populate the contact data (118) into the software application (114) and stored in the repository (116)).

Figure 5A:
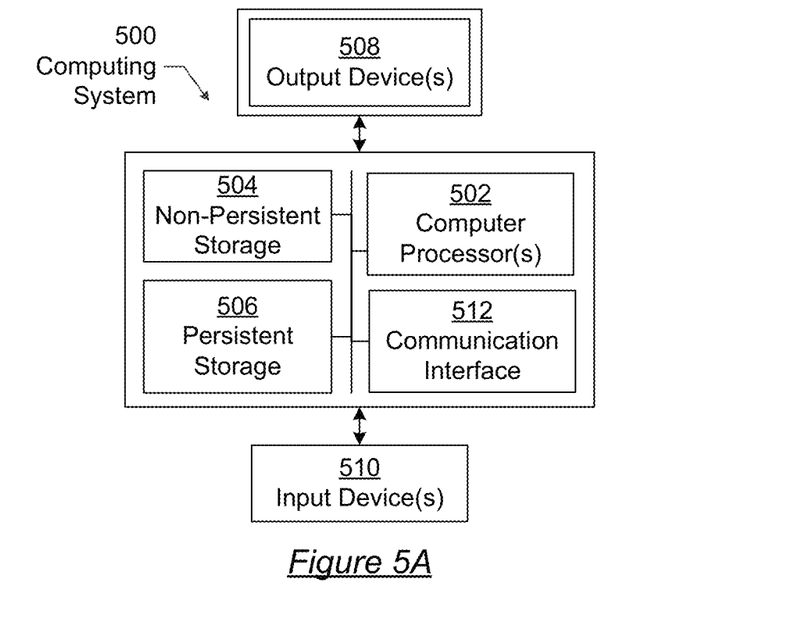
FIG. 5A and FIG. 5B show computing systems in accordance with disclosed embodiments.
Figure 5B:
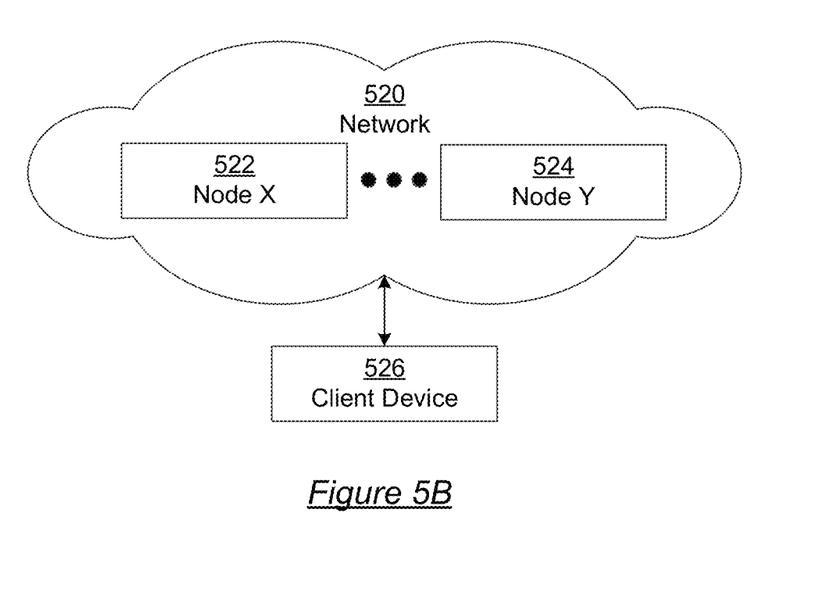

The user device (102) is an embodiment of the computing system (500) and the nodes (522) and (524) of FIG. 5A and FIG. 5B. The user device (102) includes the browser (104) with the extension (106) and accesses the servers (112), (122), (132), and (142). The user of the user device (102) may be a customer of the services provider that operates the software application (114) running on the app server (112).

The software application (114) is a program on the app server (112). The software application (114) is operated by a services provider to store, manipulate, and maintain data that is stored in the repository (116). The data includes the contact data (118), which includes contact information of individuals, organizations, and/or businesses or other grouping, that may be connected to a user. The contact information may include the name, address, phone number, email address, etc. of businesses and persons. The software application may be virtually any type of application that uses contact information, such as an address application, a financial application, a word processing application, or other software application. If the software application is a financial application, the application may be provided and/operated by a financial services provider to store, manipulate, and maintain tax, financial, and accounting data about transactions between businesses and persons that are identified in the contact data (118).

The source application (124) is a program on the source server (122). The source application (124) may be a web page operated by a directory information provider that provides reviews and contact information for businesses. The contact information from the directory information provider is stored in the repository (126) and includes the source data (128). The source data (128) may be the contact information for a particular business that is populated into the repository (116) as the contact data (118) by the extension (106).

The verification application (134) is a program on the verification server (132). The verification application (134) may expose an application programming interface (API) through the internet that provides contact information about businesses and other organizations. The verification application (134) may service a request from the user device (102) to provide the verification data (138), which is stored on the repository (136). The verification data (138) includes business contact information that the extension (106) uses to double check, verify, and supplement the source data (128). The verification data (130) provided by the verification application (134) may include additional information that is not included in the source data (128). For example, the source data (128) (extracted by the extension (106)) may not have the address of a business or other organization, which may be included in the verification data (138).

The map application (144) is a program on the map server (142). The map application (140) may expose an API through the internet that provides the map data (148), which is stored in the repository (146). The map data (148) may include a map that includes the location of the business or other organization that is being populated into the application (114) as the contact data (118).

The servers (112), (122), (132), and (142) are embodiments of the computing system (500) and the nodes (522) and (524) of FIG. 5A and FIG. 5B. The servers (112), (122), (132), and (142) may be virtual machines hosted by one or more cloud services providers to deploy the software applications (114), (124), (134), and (144).

The repositories (116), (126), (136), and (146) are computing systems that may include multiple computing devices in accordance with the computing system (500) and the nodes (522) and (524) described below in FIGS. 5A and 5B. The repositories (116), (126), (136), and (146) may be hosted by one or more cloud services providers. A cloud service provider may provide hosting, virtualization, and data storage services as well as other cloud services and the other services providers may operate and control the data, programs, and software applications that store and retrieve data from the repositories (116), (126), (136), and (146). The data in the repositories (116), (126), (136), and (146) may be processed by programs executing on the servers (112), (122), (132), and (142). The repositories (116), (126), (136), and (146) may be hosted by the same cloud services providers as the servers (112), (122), (132), and (142). The repositories (116), (126), (136), and (146) may respectively store the contact data (118), the source data (128), the verification data (138), and the map data (148).

Turning to FIG. 1B, FIG. 1B shows the software components of the browser (104) in accordance with one or more embodiments. The browser (104) includes the extension (106), displays the host page (158), and exposes the browser application programming interface (API) (162). The browser (104) retrieves the host page (158) comprising the document (160) from a web server (e.g., the source server (122) shown in FIG. 1A) and injects the content script (156) into the host page (158).

The extension (106) is a software module that extends the browser (104). The extension (106) includes the extension view (152), the extension controller (154), and the content script (156).

The extension view (152) is a view (also referred to as a window) created by the extension (106). The extension view (152) may be a software module that provides a user interface to the user of the user device (102) (shown in FIG. 1A) to display information to the user and accept input from the user.

The extension controller (154) may be a software module that controls the operation of the extension (106). The extension controller (154) passes messages back and forth to the content script (156) and manages the extension view (152) by populating the extension view (152) with data retrieved from the document (160) by the content script (156).

The host page (156) is a web page retrieved from a web server. For example, host page (156) may be a web page provided by the source server (122) (shown in FIG. 1A) that includes business or other organization contact information, which includes the source data (128).

The content script (156) is part of the extension (106) that is injected into the host page (158) by the browser (104). The content script (156) is executed as a part of the host page (158) by the browser (104). The content script (156) tracks user actions through interaction with the browser API (162). In response to a page event (e.g., a right click event and/or the selection of a right click menu item) the content script (156) may extract the source data (128) (shown in FIG. 1A) from the document (160) by reading the document object model (DOM) of the host page (158). The source data (128) (shown in FIG. 1A) from the document (160) may be identified by calculating a distance between the page event and an element from the document of the host page (156) that is accessed with the document object model.

The document object model (DOM) of the host page (156) is an interface that treats the document (160) as a tree structure. Each node or element of the tree is an object representing a part of the document (160). The DOM represents the document (160) with a logical tree. Each branch of the tree ends in a node, and each node contains objects.

The document (160) is a web page that is retrieved from the source server (122) (shown in FIG. 1A). The document (160) may be an extensible markup language (XML) document, a hypertext markup language (HTML) document, etc. The document (160) includes the source data (128) (shown in FIG. 1A).

The browser API (162) is an interface that provides access to the functions and data available from the browser (104). The browser API (162) is used by the content script (156) to identify the mouse location and the location of elements from the document (160) that are displayed to a user of the user device (102).

Although FIGS. 1A and 1B show a certain configuration of components, other configurations may be used without departing from the scope of the invention. For example, the software application may be a local application executing on a same computing device as the browser. Further, the contact information for the software application may be locally stored. As another example, the browser extension may perform various operations by forwarding page event information and rendered page from the browser to a server or other program that performs the operations described herein. In such an example, the browser extension may be indirectly connected to the various servers.

Figure 2:
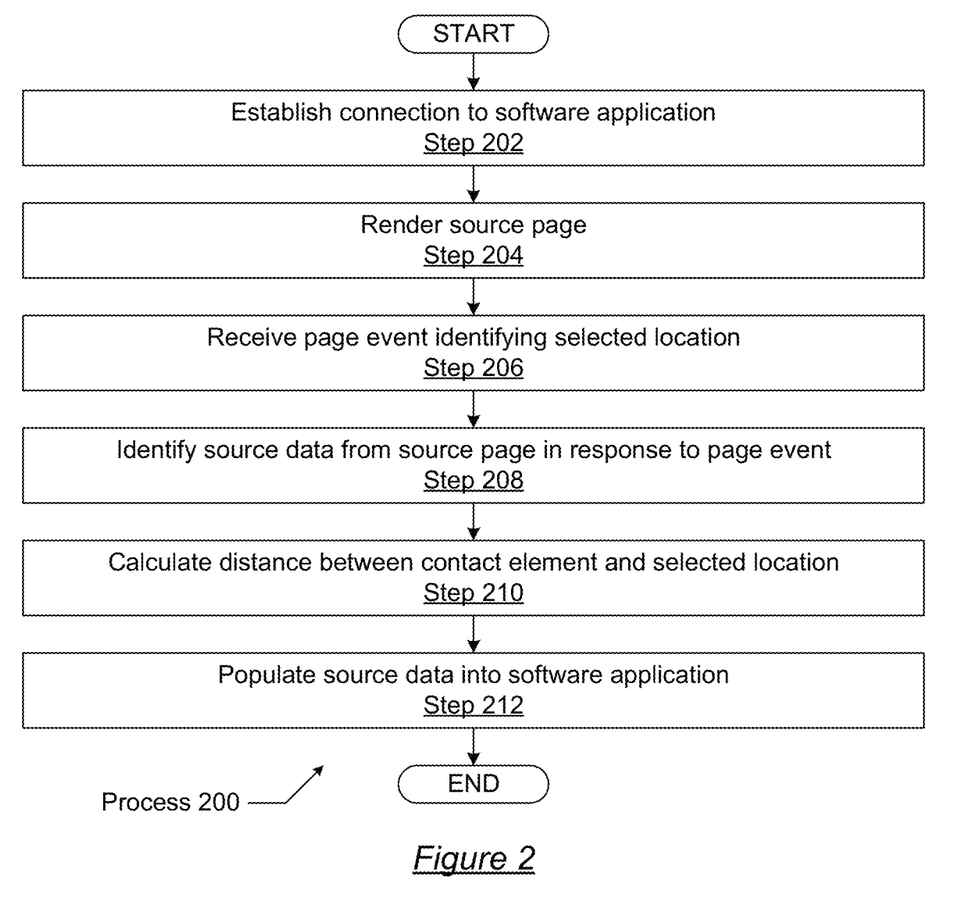
FIG. 2 shows a flowchart in accordance with disclosed embodiments.

FIG. 2 shows a flowchart of the process (200) in accordance with the disclosure. The embodiment of FIG. 2 may include or be included within the features and embodiments described in the other figures of the application. The features of FIG. 2 are, individually and as an ordered combination, improvements to the technology of computing systems and browsers. While the various steps in the flowchart are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, in Step 202 a connection is established to a software application. The connection may be established by logging into the software application. The software application may be hosted as a website by the app server that the browser logs into with a username and password provided by the user. The connection may automatically disconnect after a threshold amount of idle time, e.g., 10 minutes. As another example, the connection may be established with a local application.

In Step 204, a source page is rendered. The source page may be rendered with the browser of a user device. The browser may send a request for a page to the source server hosting the source application, which is a website. The source application responds to the browser request by transmitting a source page with source data. The browser request may be a search for a business using the source application (website) that may include one or more pieces of contact information (e.g., the name, location, phone number, etc.) of the business. In response to the browser request, the source application may generate a source page that includes the source data and is responsive to the browser request. After receiving the source page from the source server, browser renders the source page and displays the source page on a screen of the user device.

In Step 206, a page event is received that identifies a selected location. The page event may be a right click event that is received by the browser extension from the browser API in response to a right click on the page displayed in the browser after rendering the page. The page event may identify a selected location of the source page that corresponds to the location of a mouse pointer with respect to the page displaying within the browser. The mouse pointer is displayed on the user device to identify the hotspot or active pixel that corresponds to the mouse location. In one or more embodiments, the page event include a long press event on a touch sensitive device.

After the page event is received, a context menu may be displayed by the browser near the location of the mouse pointer. The context menu includes menu items, which may include an extension menu item. The extension menu item may be added to the context menu by the extension. Selection of the extension menu item from the context menu may trigger execution of the extension.

In Step 208, source data is identified from the source page after receiving the page event. The source data may include a business name. The source data may be from an element in the source page, which is accessed using the document object model of the source page. The browser may identify a clicked element that corresponds to the selected location, but the clicked element may not have contact information related to the business identified and described in the source page. The extension may search for other elements (referred to as search elements) within a threshold distance to the clicked element to identify a contact element that includes contact information for the business. The search elements may include the parent elements, child elements, and sibling elements of the clicked element. Elements that include contact information may be referred to as contact elements from which the source data may be extracted.

The source data within an element may be identified with a search pattern that matches telephone numbers. The search pattern may be a regular expression that matches telephone numbers that follow the North American Numbering Plan (NANP) that are embedded within the elements of the source page. The regular expression "[2-9]{1}[0-9]{2}" matches numbering plan area code (NPA) of a NANP telephone number. The regular expression "([2-9]{1}[0-9]{2}|[a-zA-Z]{3})" matches the central office exchange code (NXX) of a NANP telephone number. The regular expression "([0-9]{4}|[a-zA-Z]{4})" matches the line number (xxxx) of a NANP telephone number. These regular expressions may be combined into the regular expression below, which is a nonlimiting example.
\s*(\+?1)?\s*-?\s*\(?\s*[2-9] {1}[0-9] {2}\s*\)?\s*-?\s*([2-9] {1}[0-9] {2}|[a-zA-Z] {3})\s*-?\s*([0-9] {4}|[a-zA-Z]{4})

The regular expression above includes additional expressions to match punctuation and white space that may be included in a telephone number on the source page. The regular expression above may match the numbers below.
+1-(301)-(987)-(6543)
1-800-FLOWERS Regular expressions that correspond to other territories and countries may also be used. Different regular expressions may match additional types of data beyond telephone numbers, including names, physical addresses, email addresses, etc.

The elements of the source page may have several properties that identify whether an element is a visible element, a header element, or a clickable element. Visible elements are visible to the user of the user device. Header elements are distinguished from body elements; and header elements may contain headings or titles. Clickable elements are elements that a user may click on. When it is determined that an element is a visible element, a header element, or a clickable element, the contact information from the element may be extracted. For example, a business name may be extracted from a contact element when the contact element satisfies one or more determinations that the contact element a visible element, a header element, or a clickable element.

Properties of the elements of the source page may also include the font size and the font style. The font size, the font style and the location of an element with respect to a review section of a source page may be used to determine whether an element is a contact element with contact information. The review section may include a review of the business with a rating of the business.

For example, an element with a font size between a minimum pixel threshold (e.g., 13 pixels (px)) and a maximum pixel threshold (e.g., 31 pixels), with a font size that is greater than surrounding elements, and that is located above or adjacent to a review section of the source page may be identified as a contact element. The business name may then be extracted from the contact element. Additionally, the font style of an element may be compared with the font style of the surrounding elements. For example, an element that is bold with surrounding elements that are not bold may indicate that the element includes the name of a business.

Multiple determinations may be used to identify a probability that an element includes the name of a business. As an example, code for determining whether an element includes a business name may be applied to the elements of an HTML page parsed using a document object model. If an element is visible, is displayed, has text with a length greater than 0 characters, has a font size greater than the font size of a previous element minus one, has a height greater than a threshold height (e.g., 13 pixels), and a width greater than a threshold width (e.g., 10 pixels), then a probability may be calculated for the element.

The probability of an element being a business name may start with an initial value (e.g., "100") and then be modified based on additional determinations. If an element is not a header element, then the probability may be decreased (e.g., multiplied by 0.5). If the element is a link, then the probability may be increased (e.g., multiplied by 1.2). If the size of the element (e.g., the height in pixels of the element displayed on the screen) is between a minimum and maximum thresholds (e.g., 13 and 31 pixels), then the probability may be increased (e.g., multiplied by 1.3). If the font weight of the element, which identifies a thickness of the font, is greater than a normal thickness (e.g., a thickness of 400), then the probability may be increased (e.g., multiplied by 1.2). After the preceding determinations, if the probability is greater than the initial probability (e.g., "100"), the probability may be reset to the initial probability (e.g., "100").

The probability may then be adjusted based on the distance between the element and the selected location (which may also be referred to as a position). The distance may be calculated as the hypotenuse between the location of the element and the selected location (of the right click). The probability may be decreased an amount proportional to the distance. For example, the distance may be divided by a constant (e.g., 10,000) and then subtracted from the probability so that elements farther from the selected location will have a lower probability.

After determining probabilities for the elements of the page, the element with the highest probability may be identified as the business name. The text may be extracted from the element with the highest probability as the source data.

After the source data is extracted from the source page, the source data may be verified. The source data may be verified with verification data from a verification server. The extension may connect to a verification server that provides business listing information in response to API calls. The extension may provide the business name from the source data to the verification server as a search request. The verification server may provide a search result that includes the business listing information for businesses match the business name.

After receiving the verification data, the extension may use the verification data to supplement the source data. For example, the verification data may include additional contact and location information (e.g., telephone number, email address, physical address) that may not have been extracted from the source page as the source data. The additional contact and location information from the verification data may be included in the source data when the source data is used to populate the contact data in the software application.

In Step 210, a distance is calculated between a contact element and the selected location. Multiple elements of a source page may include text that could be the name of the business. The extension may determine which element is closest to the source location to identify the contact element with the business name. The distance may be calculated by the extension by calculating the Euclidean distance between the display location of an element and the source location with the element with the shortest distance being identified as the contact element. Additional factors may be used as described above (including visibility, whether the element is a header, click ability, font size, font style, etc.) and combined to form a probability.

In Step 212, source data is populated into the software application. The source data may be populated into the software application as contact data by the extension. The extension may open a view to display the source data to the user of the user device prior to populating the software application. In one or more embodiments, the connection to the software application may be established after opening the view.

In addition to displaying the source data, the extension may retrieve and display map data. The map data may be retrieved from a map server using the source data that has been supplemented with the verification data. For example, the extension may send a search request to the map server that includes the physical address of the business that was retrieved in the verification data from the verification server. In response, the map server may provide a map image that illustrates the location of the business, which is displayed in the view generated by the extension. The source data with the verification data and the map data may be presented to the user prior to populating the source data into the software application.

After displaying the source data to the user, the extension may populate the source data into the software application in response to interaction from the user. For example, the user may press a button displayed in the view with the source data. Selection of the button may trigger the extension to interact with the API of the software application to store the source data as contact data in the software application.

After populating the source data to the software application, the extension may open a new browser window or tab that loads and displays the software application. The new browser window or tab may show the contact entry for the business within the software application.

FIGS. 3A, 3B, 4A, and 4B show examples of systems and interfaces in accordance with the disclosure. The embodiments of FIGS. 3A, 3B, 4A, and 4B may be combined and may include or be included within the features and embodiments described in the other figures of the application. The features and elements of FIGS. 3A, 3B, 4A, and 4B are, individually and as a combination, improvements to the technology of computing systems. The various features, elements, widgets, components, and interfaces shown in FIGS. 3A, 3B, 4A, and 4B may be omitted, repeated, combined, and/or altered as shown. Accordingly, the scope of the present disclosure should not be considered limited to the specific arrangements shown in FIGS. 3A, 3B, 4A, and 4B.

Figure 3A:
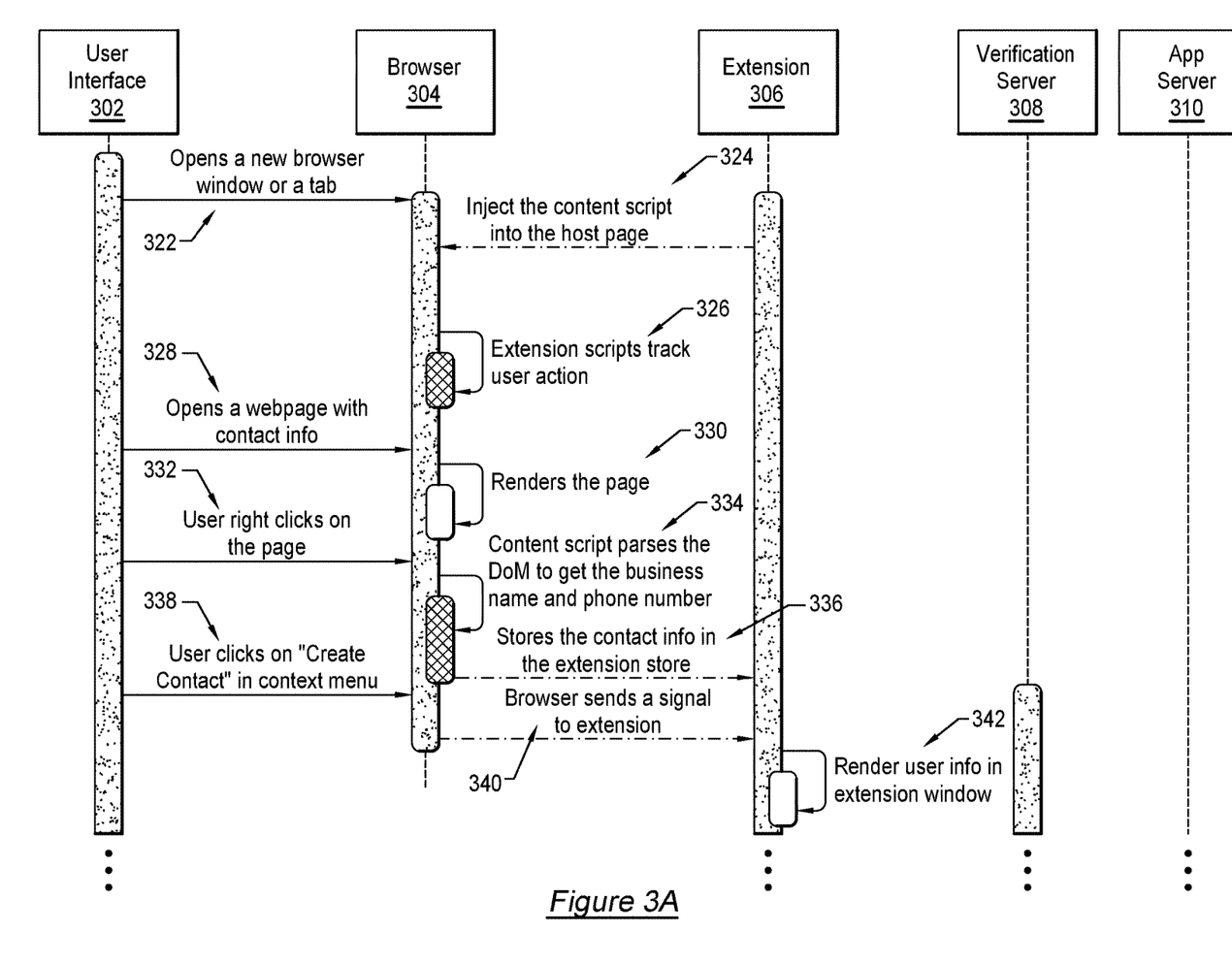
FIG. 3A, FIG. 3B, FIG. 4A, and FIG. 4B show examples in accordance with disclosed embodiments.
Figure 3B:
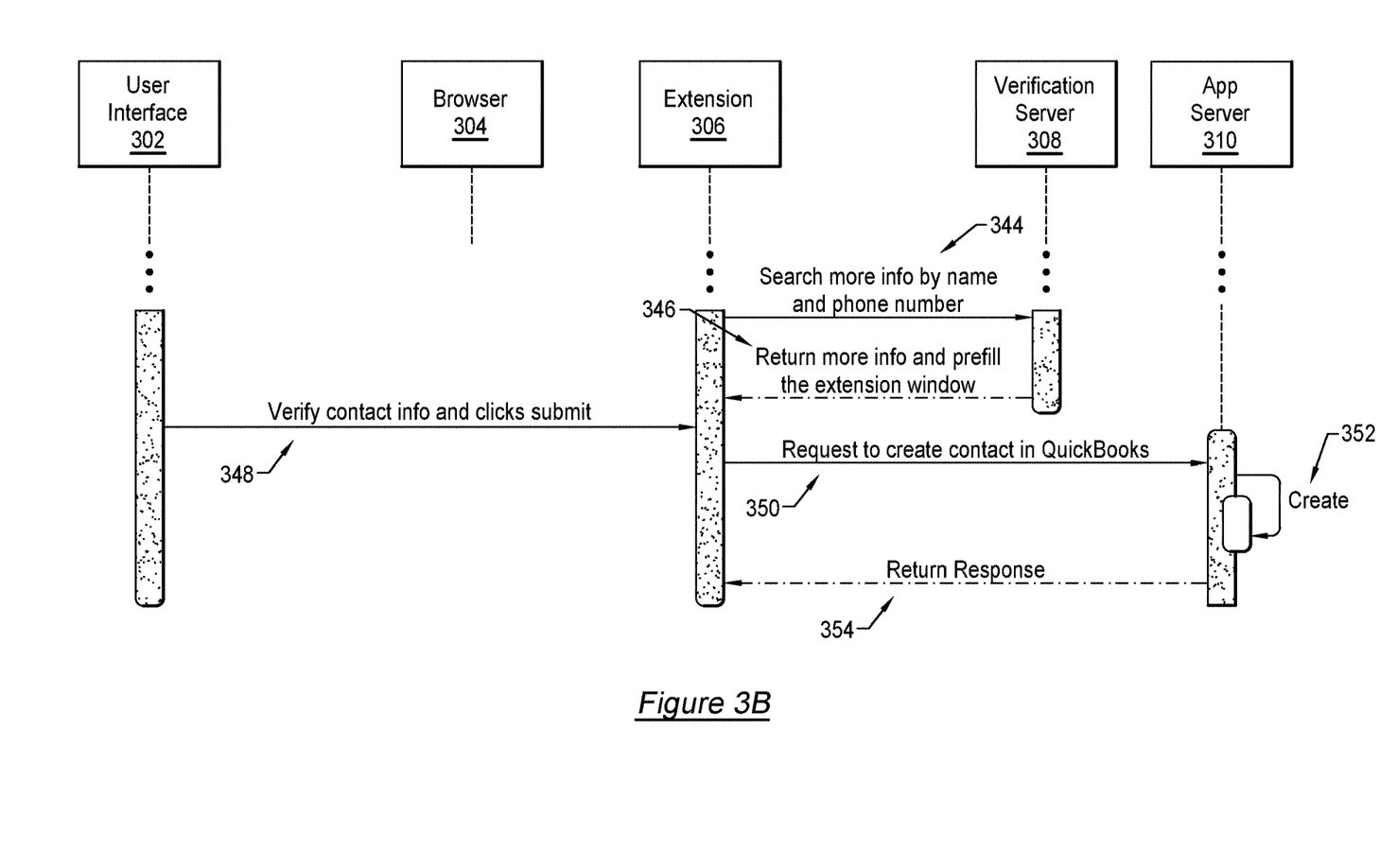

FIGS. 3A and 3B show a sequence diagram of the interaction between components of the system. Turning to FIG. 3A, a user interacts with a user device that includes the user interface (302), the browser (304), and the extension (306). The user device interacts with the verification server (308) and the app server (310). In Step 322, a user interacts with the user interface (302) to open a new browser window or tab with the browser (304). In Step 324, the extension (306) injects the content scripts (also referred to as extension scripts) of the extension (306) into the pages loaded by the browser (304). In Step 326, the extension scripts injected into the browser (304) execute on the browser (304) to track user actions performed with the user interface (302).

In Step 328, a web page with contact information is opened by the browser (304) in response to user interaction with the user interface (302). In Step 330, the browser (304) renders the page that was opened. In Step 332, the user right clicks on the page that was rendered and displayed. In Step 334, the content scripts executing in the browser (304) parses the document object model of the page to extract a business name and phone number. The extraction may be based on the type of elements relative to the surrounding elements and the location of the elements with respect to the location of right click (i.e., the selected location). In Step 336, the contact information is stored to the extension (306) in a memory of the extension referred to as an extension store.

In Step 338, user clicks on a "Create Contact" menu item in a context menu. The context menu is a right click menu that was displayed in response to the right click performed on the page. In Step 340, the browser (304) sends a signal to the extension (306), which is in response to clicking on the "Create Contact" menu item.

In Step 342, user information is rendered into an extension window (also referred to as a view) of the extension (306) in response to the signal from the browser (304). The user information may include the user credentials for the software application hosted by the app server (310). If the user has not already logged into the software application, the user may log in at this time.

Turning to FIG. 3B, in Step 344, the extension (306) searches for more information using the name and phone number extracted from the page. The extension (306) connects to the verification server (308) and sends a search request that may include the name and phone number of a business.

In Step 346, more information is returned and the extension window is prefilled with the information. The verification server (308) returns verification data based on name and phone number from the search request from the extension (306). The extension (306) supplements the contact information from the original page with the verification data from the replication server (308). The supplemented contact information is prefilled into the extension window. The extension window may include edit boxes for the contact information that may be edited by the user and added to the software application. The edit boxes may be prefilled with the supplemented contact information from the page and from the verification server (308).

In Step 348, the user verifies the contact information and clicks a submit button on the extension window. In Step 350, the extension (306) sends a request to the app server (310) to create a contact in the software application. In Step 352, the app server (310) creates a contact. In the step (354), a response is returned from the app server (310) to the extension (306), which may be displayed to the user to indicate that the contact was created in the software application using the contact information extracted from the page.

Figure 4A:
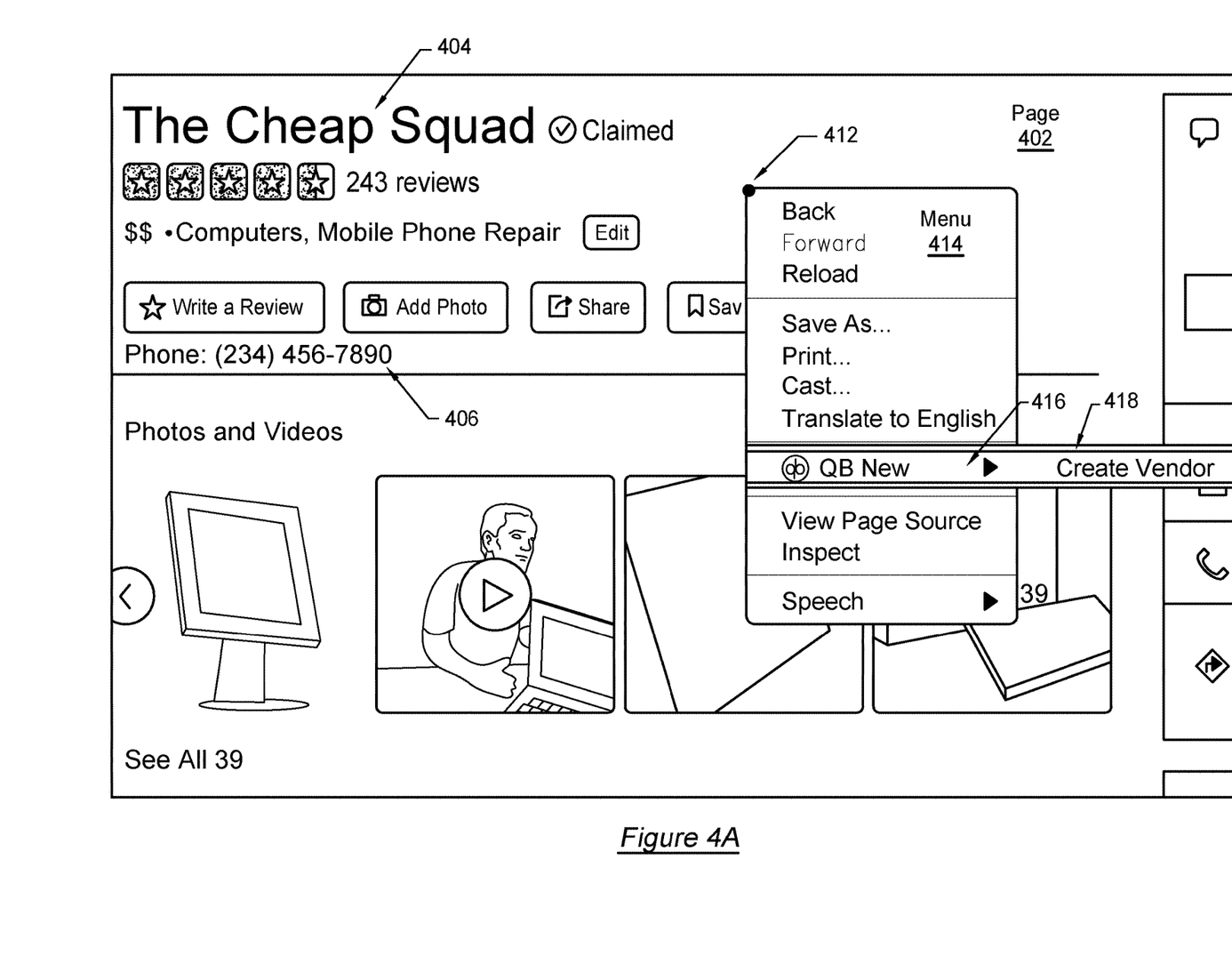
Figure 4B:
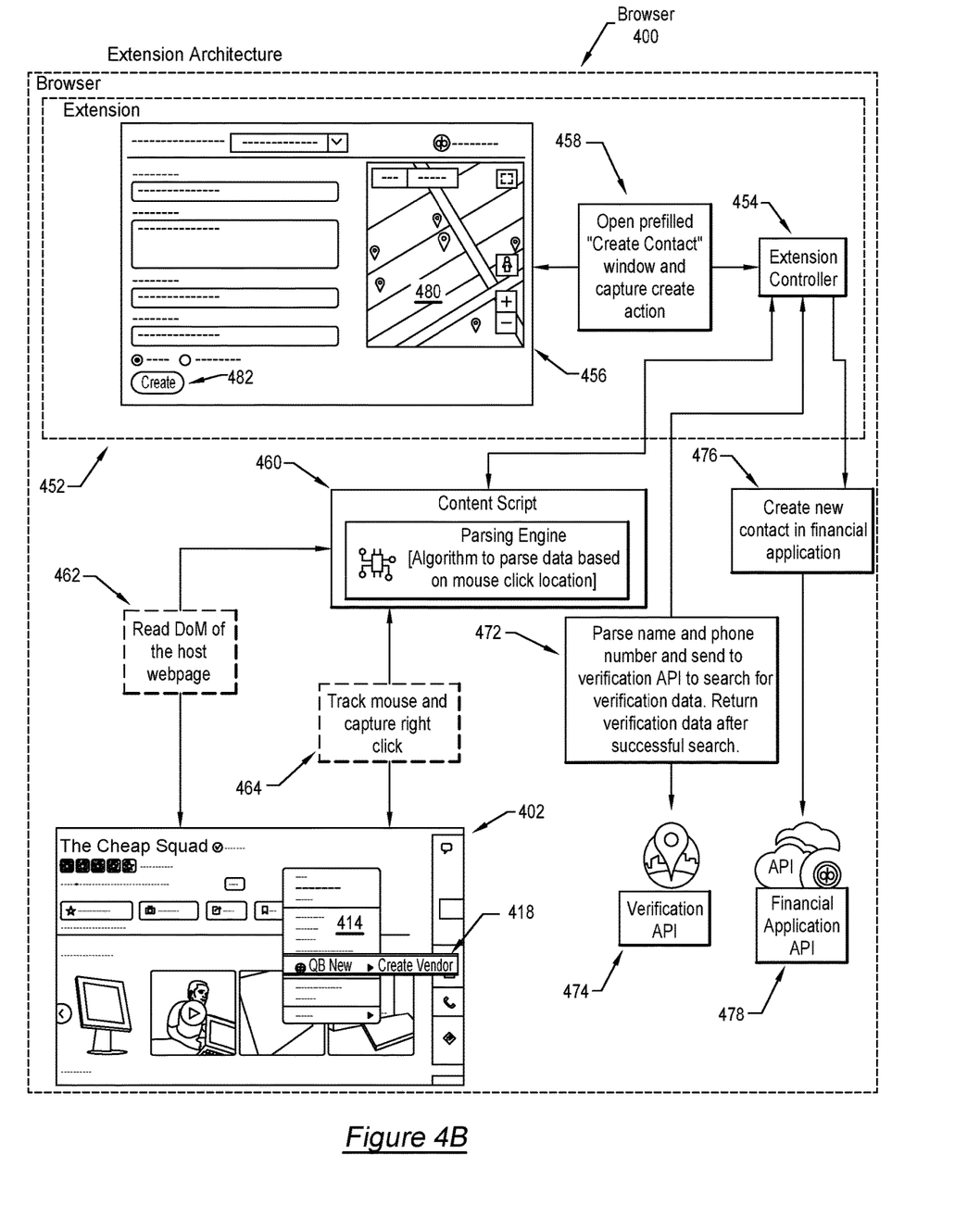

FIGS. 4A and 4B show an example of an extension that extracts contact information from a page and creates a contact in a software application with the extracted contact information. Turning to FIG. 4A, The page (404) is rendered and displayed in the browser (400) (shown in FIG. 4B). The page (402) includes the business name (404) ("The Cheap Squad") with the phone number (406) ("(234) 456-7(890)").

The user right clicks on the page (402) at the selected location (412), which brings up the context menu (414). The context menu (414) is a context menu that includes the menu item (416). The menu item (416) was injected into the browser (400) by the extension (452) (shown in FIG. 4B). Hovering over the menu item (416) brings up another menu (also referred to as a submenu) that includes the menu item (418). Selection of the menu item (418) triggers execution of the extension (452) with the page (402).

Turing to FIG. 4B, the browser (400) includes the extension (452), which operates through the extension controller (454). The browser (400) loads the page (402). The content script (460) is injected into the page (402) by the browser (400). The content script (460) performs the function (464) to track user interface events including right click events. In response to detecting a right click event, the menu (414) is displayed on the page (402) in the browser (400). The menu item (418) is then selected, which triggers performance of the function (462) to read the document object model of the page (402) and locate the source data that identifies the name and phone number for the business referenced in the page (402).

After extracting the source data from the page (402), the extension (452) performs the function (472) to parse name and phone number from the source data and send a search request to the verification API (474). The verification API (474) returns verification data in a search result after a successful search based on the search request from the extension (452). The source data extracted from the page (402) is supplemented with the verification data retrieved using the verification API (474).

After verifying and supplementing the source data, the extension performs the function (458) to open the prefilled "Create Contact" window (456) (also referred to as an extension view). The window (456) is filled in with the supplemented source data by the extension (452). The window (456) also includes the map (480), which was retrieved from a map server using a map API and which shows the location of the business from the page (402).

After the button (482) is selected, the extension (452) performs the function (476). The function (476) creates a new contact in the software application using the application API (478). The new contact is created by populating the software application with the source data, which is stored as a contact by the software application.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A—B), and the status flags may be read to determine if the result is positive (i.e., if A>B, then A—B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    establishing a connection to a software application;
    receiving, by an extension of a browser, a page event from the browser after rendering a source page from a source server, the page event identifying a selected location of the source page, the selected location being a mouse pointer location defined with respect to the source page displayed in the browser;
    identifying source data from the source page after receiving the page event;
    calculating a distance between a contact element of the source page and the selected location to select the source data, wherein the contact element comprises an address forming at least a portion of the source data; and
    populating the source data into the software application.

2. The method of claim 1, further comprising:
    retrieving map data from a map server using verification data; and presenting the verification data with the map data prior to populating the source data into the software application.

3. The method of claim 1, further comprising:

presenting a context menu in response to receiving the page event; and receiving a selection event identifying an extension menu item from the context menu, the extension menu item added to the context menu by the extension.

4. The method of claim 1, further comprising:

identifying the source data with a search pattern that matches telephone numbers.

5. The method of claim 1, further comprising:

extracting a name from the contact element in response to the contact element satisfying one or more of a group of determinations, the group comprising:
determining that the contact element is a visible element,
determining that the contact element is a header element, and
determining that the contact element is a clickable element.

6. The method of claim 1, further comprising:

extracting a name from the contact element in response to the contact element satisfying one or more of a group of determinations, the group comprising:
determining that a font size of the contact element is between a minimum pixel threshold and a maximum pixel threshold,
determining that the font size of the contact element is greater than a font size of surrounding elements that surround the contact element,
determining that a font style of the contact element is different from a font style of the surrounding elements, and
determining that the contact element is above or adjacent to a review section of the source page.

7. The method of claim 1, further comprising:

verifying the source data with verification data from a verification server.

8. The method of claim 1, further comprising:

supplementing the source data with verification data from a verification server before populating the source data into the software application.

9. A system comprising:

a processor;
a memory coupled to the processor;
the memory comprising a browser, wherein the browser executes on the processor, uses the memory, and is configured for:
rendering, by the browser, a source page from a source server;
the memory comprising an extension, wherein the extension executes on the processor, uses the memory, and is configured for:
receiving, by the extension, a page event from the browser after rendering the source page, the page event identifying a selected location of the source page, the selected location being a mouse pointer location defined with respect to the source page displayed in the browser;
identifying source data from the source page after receiving the page event;
calculating a distance between a contact element of the source page and the selected location to select the source data, wherein the contact element comprises an address forming at least a portion of the source data; and
populating the source data into a software application.

10. The system of claim 9, wherein the extension is further configured for:

retrieving map data from a map server using verification data; and presenting the verification data with the map data prior to populating the source data into the software application.

11. The system of claim 9, wherein the extension is further configured for:

presenting a context menu in response to receiving the page event; and receiving a selection event identifying an extension menu item from the context menu, the extension menu item added to the context menu by the extension.

12. The system of claim 9, wherein the extension is further configured for:

identifying the source data with a search pattern that matches telephone numbers.

13. The system of claim 9, wherein the extension is further configured for:

extracting a name from the contact element in response to the contact element satisfying one or more of a group of determinations, the group comprising:
determining that the contact element is a visible element,
determining that the contact element is a header element, and
determining that the contact element is a clickable element.

14. The system of claim 9, wherein the extension is further configured for:

extracting a name from the contact element in response to the contact element satisfying one or more of a group of determinations, the group comprising:
determining that a font size of the contact element is between a minimum pixel threshold and a maximum pixel threshold,
determining that the font size of the contact element is greater than a font size of surrounding elements that surround the contact element,
determining that a font style of the contact element is different from a font style of the surrounding elements, and
determining that the contact element is above or adjacent to a review section of the source page.

15. The system of claim 9, wherein the extension is further configured for:

verifying the source data with verification data from a verification server.

16. The system of claim 9, wherein the extension is further configured for:

supplementing the source data with verification data from a verification server before populating the source data into the software application.

17. A set of one or more non-transitory computer readable mediums comprising computer readable program code for:

establishing a connection to a software application;

receiving, by an extension of a browser, a page event from the browser after rendering a source page from a source server, the page event identifying a selected location of the source page, the selected location being a mouse pointer location defined with respect to the source page displayed in the browser;

identifying source data from the source page after receiving the page event;

calculating a distance between a contact element of the source page and the selected location to select the source page, wherein the contact element comprises an address forming at least a portion of the source data; and populating the source data into the software application.

18. The set of one or more non-transitory computer readable mediums of claim 17, further comprising computer readable program code for:

retrieving map data from a map server using verification data; and presenting the verification data with the map data prior to populating the source data into the software application.

19. The set of one or more non-transitory computer readable mediums of claim 17, further comprising computer readable program code for:

presenting a context menu in response to receiving the page event; and receiving a selection event identifying an extension menu item from the context menu, the extension menu item added to the context menu by the extension.

20. The set of one or more non-transitory computer readable mediums of claim 17, further comprising computer readable program code for:

identifying the source data with a search pattern that matches telephone numbers.

* * * * *